(12) United States Patent
Eguchi et al.

(10) Patent No.: US 11,711,482 B2
(45) Date of Patent: Jul. 25, 2023

(54) ELECTRONIC DEVICE CONTROL USING USER IDENTIFICATION

(71) Applicant: Seiko Epson Corporation, Tokyo (JP)

(72) Inventors: Haruya Eguchi, Kitakyushu (JP); Nobu Tagawa, Fukutsu (JP); Masaya Kobayashi, Umi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/655,660

(22) Filed: Mar. 21, 2022

(65) Prior Publication Data

US 2022/0303432 A1 Sep. 22, 2022

(30) Foreign Application Priority Data

Mar. 22, 2021 (JP) ................................ 2021-046978

(51) Int. Cl.
*H04N 1/00* (2006.01)
*H04N 1/44* (2006.01)
*G06F 21/34* (2013.01)

(52) U.S. Cl.
CPC .......... *H04N 1/4426* (2013.01); *G06F 21/34* (2013.01); *H04N 1/00037* (2013.01); *H04N 1/00082* (2013.01); *H04N 1/00411* (2013.01); *H04N 1/00413* (2013.01)

(58) Field of Classification Search
CPC ........... H04N 1/00037; H04N 1/00082; H04N 1/00411; H04N 1/00413; H04N 1/4426; H04N 1/00509; H04N 1/00514; H04N 1/0097; H04N 2201/3276; H04N 2201/006; G06F 21/34
USPC ......................................................... 358/1.15
See application file for complete search history.

(56) References Cited

U.S. PATENT DOCUMENTS

| | | | | |
|---|---|---|---|---|
| 2007/0277173 | A1* | 11/2007 | Tokimoto | G06F 3/1208 718/100 |
| 2009/0103124 | A1* | 4/2009 | Kimura | G06F 3/1292 358/1.15 |
| 2010/0225962 | A1* | 9/2010 | Okigami | H04N 1/21 358/1.15 |
| 2019/0095141 | A1* | 3/2019 | Yoshihara | G06F 3/0488 |
| 2019/0289149 | A1* | 9/2019 | Iwamoto | G06F 3/1285 |

FOREIGN PATENT DOCUMENTS

JP 2010-269563 12/2010

* cited by examiner

*Primary Examiner* — Kent Yip
(74) *Attorney, Agent, or Firm* — Workman Nydegger

(57) ABSTRACT

Provided is an electronic device in which, after user authentication is executed on the basis of identification information of a user acquired through a reader configured to read information from a contactless medium, a control unit causes a display unit to display a home screen when no job corresponding the identification information is registered, the control unit executes a process according to one piece of a job when only the one job is registered, and the control unit executes a process according to a job selected through an operation of the user from among two or more jobs when the two or more jobs are registered.

5 Claims, 11 Drawing Sheets

| IDENTIFICATION INFORMATION | FAVORITE JOB |
|---|---|
| 123*** | JOB 1 (COLOR, PDF, FOLDER 1, ...) |
| | JOB 2 (MONOCHROME, PDF, FOLDER 2, ...) |
| | JOB 3 (COLOR, JPEG, FOLDER 1, ...) |
| 456*** | JOB 4 (...) |
| | JOB 5 (...) |
| 789*** | JOB 6 (...) |
| XYZ*** | |
| ... | ... |

ELECTRONIC DEVICE CONTROL USING USER IDENTIFICATION

The present application is based on, and claims priority from JP Application Serial Number 2021-046978, filed on Mar. 22, 2021, the disclosure of which is hereby incorporated by reference herein in its entirety.

BACKGROUND

1. Technical Field

The present disclosure relates to an electronic device, a method of controlling an electronic device, and a system for controlling an electronic device.

2. Related Art

In connection with an electronic device, there is known a scheme in which identification information unique to a user is inputted, and user authentication is executed on the basis of the identification information to allow the user to use the electronic device.

In addition, there is a disclosure having a configuration in which customization is performed such that a customized script having a setting value designated by a user is registered or not registered to an image formation device, to cause a UI device to display an initial screen including an easy copy screen, an authentication screen, or a default menu screen (see JP-A-2010-269563).

Here, as for an electronic device that requires user authentication, there is a demand for the electronic device capable of executing a user's favorite process through operations in a simplified manner. In such a perspective, there is room for improvement in JP-A-2010-269563.

SUMMARY

An electronic device that executes user authentication by acquiring identification information of a user from a contactless medium in which the identification information is written, includes a process execution unit configured to execute a process according to a setting, a storage unit in which a correspondence relationship between the identification information and a job that is a combination of the setting is registered in advance, a display unit, and a control unit, in which the control unit refers to the storage unit after user authentication is executed on the basis of the identification information acquired through a reader configured to read information from the contactless medium, when the job corresponding to the identification information is not registered in the storage unit, the control unit causes the display unit to display a predetermined home screen concerning the electronic device, when only one job corresponding to the identification information is registered in the storage unit, the control unit causes the process execution unit to execute a process according to the one job, and when two or more jobs corresponding to the identification information are registered in the storage unit, the control unit causes the process execution unit to execute a process according to a job selected through an operation of the user from among the two or more jobs.

A method of controlling an electronic device includes an authentication step of executing user authentication on the basis of identification information of a user acquired through a reader configured to read information from a contactless medium in which the identification information is written, a job acquiring step of referring to a storage unit in which a correspondence relationship between the identification information and a job that is a combination of a setting concerning a process executed by an electronic device is registered in advance, to acquire a registration state of the job corresponding to the identification information, and a job display execution step of causing a display unit to display a predetermined home screen concerning the electronic device when the job corresponding to the identification information is not registered in the storage unit, causing the electronic device to execute a process according to one job when only the one job corresponding to the identification information is registered in the storage unit, and causing the electronic device to execute a process according to a job selected through an operation of the user from among two or more jobs when the two or more jobs corresponding to the identification information is registered in the storage unit.

A system for controlling an electronic device includes an electronic device configured to execute user authentication by acquiring identification information of a user from a contactless medium in which the identification information is written, and a terminal device coupled to the electronic device in a communicable manner, in which the electronic device includes a process execution unit configured to execute a process according to a setting, a display unit, and a control unit, the terminal device includes a storage unit in which a correspondence relationship between the identification information and a job that is a combination of the setting is registered in advance, the control unit communicates with the terminal device to refer to the storage unit after user authentication is executed on the basis of the identification information acquired through a reader configured to read information from the contactless medium, when the job corresponding to the identification information is not registered in the storage unit, the control unit causes the display unit to display a predetermined home screen concerning the electronic device, when only one job corresponding to the identification information is registered in the storage unit, the control unit causes the process execution unit to execute a process according to the one job, and when two or more jobs corresponding to the identification information are registered in the storage unit, the control unit causes the process execution unit to execute a process according to a job selected through an operation of the user from among the two or more jobs.

BRIEF DESCRIPTION OF THE DRAWINGS

FIG. 3 is a diagram illustrating an example of a portion of a job registration table.

DESCRIPTION OF EXEMPLARY EMBODIMENTS

Below, embodiments according to the present disclosure will be described with reference to the drawings. Note that each of the drawings is merely an example given for the purpose of explaining the present embodiments. Since the drawings are given as examples, the ratio or shape may not be accurate, or may be contradict to each other. In addition, some items may not be illustrated.

1. DEVICE CONFIGURATION

Figure 1:
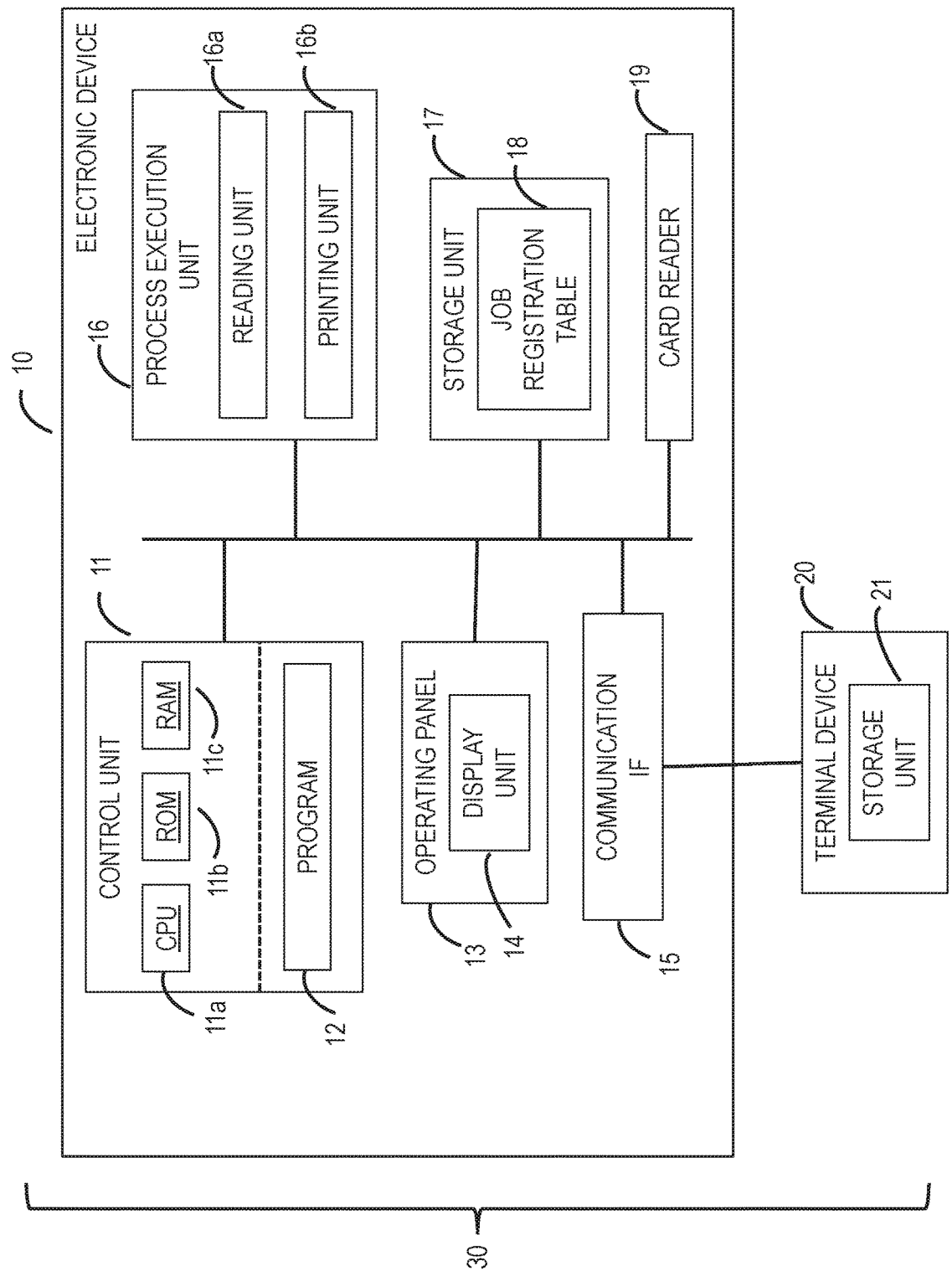
FIG. 1 is a block diagram illustrating a system configuration in a simplified manner.

FIG. 1 schematically illustrates a configuration of a system 30 including an electronic device 10 according to the present embodiment. The system 30 is also called a system for controlling the electronic device 10.

The electronic device 10 includes, for example, a control unit 11, an operating panel 13, a communication IF 15, a process execution unit 16, a storage unit 17, and a card reader 19. The operating panel 13 includes a display unit 14. The display unit 14 is a unit used to display visual information, and includes, for example, a liquid crystal display, an organic EL display, or the like. The "IF" represents an interface. The control unit 11 is configured to include one or more ICs including a CPU 11a serving as a processor, a ROM 11b, a RAM 11c, and the like, and also include other nonvolatile memories or the like.

In the control unit 11, the processor, namely, the CPU 11a executes a computation process in accordance with one or more programs 12 stored in the ROM 11b or other memories by using the RAM 11c or the like as a work area, thereby controlling individual portions of the electronic device 10 including the display unit 14 and the process execution unit 16. Note that the processor is not limited to one CPU, and may have a configuration in which a plurality of CPUs or hardware circuits such as an ASIC execute processing or may have a configuration in which the CPU and the hardware circuits work in a collaborative manner to execute processing.

The operating panel 13 serves as a unit used to receive operations by a user, and is achieved, for example, by a physical button, a touch panel, a keyboard, or the like. The touch panel is achieved as one function of the display unit 14. The communication IF 15 is a generic term for one or a plurality of IFs used to couple the printing apparatus 10 to the outside in a wired or wireless manner, in accordance with a predetermined communication protocol including a known communication standard. In the example in FIG. 1, the electronic device 10 is coupled to an external terminal device 20 through the communication IF 15 in a communicable manner.

The process execution unit 16 is a unit used to achieve primary functions of the electronic device 10, and includes, for example, a reading unit 16a. The reading unit 16a includes, for example: a transport unit configured to transport an original document serving as the target of reading; a light source configured to irradiate the transported original document; an imaging element configured to optically read the original document to generate read image data; and a processing circuit configured to apply image processing, conversion processing, or storage processing to the read image data. The original document is one example of a "processing target medium" to be processed by the process execution unit 16. The electronic device 10 including the reading unit 16a may be called a reading device or a scanner.

The process execution unit 16 may include, for example, a printing unit 16b. The printing unit 16b includes a transport unit configured to transport a printing medium such as a sheet, a printing head configured to execute printing to the transported printing medium using ink or toner, and a printer engine. The printing medium is one example of the "processing target medium" to be processed by the process execution unit 16. The electronic device 10 including the printing unit 16b may be called a printing apparatus or a printer.

When the process execution unit 16 includes the reading unit 16a and the printing unit 16b, it is natural that it is possible to execute a process in which the printing unit 16b executes printing on the basis of the read image data generated by the reading unit 16a, that is, it is possible to create a copy of the original document. The electronic device 10 including the reading unit 16a and the printing unit 16b may be referred to as a copy machine or may be referred to as a multifunction device.

Although detailed description will not be made, the process execution unit 16 may be a unit that can execute various types of processing not only including scanning of an original document and printing to a printing medium but also including facsimile communication and electronic email transmission-reception.

The storage unit 17 is a storage unit including, for example, a hard disk drive, a solid state drive, or other memories. The memory that the control unit 11 includes may be regarded as the storage unit 17. The storage unit 17 may be regarded as a portion of the control unit 11. In the example in FIG. 1, a job registration table 18 is held in the storage unit 17 of the electronic device 10. The job registration table 18 will be described later.

The card reader 19 is a reader configured to be able to read information from a "contactless medium" in which identification information of a user is written. The identification information of a user is information unique to each user, and includes, for example, a user name, an ID number, a passcode, or the like. The contactless medium is an item on which IC chip in which the identification information of a user is written is mounted, and typically, is a card-type medium. However, the shape of the contactless medium may not be a card type. The card reader 19 reads information from the contactless medium using near field communication with the contactless medium that is brought closer to the card reader 19. Any communication standard may be used for the card reader 19. The card reader 19 may be built in the electronic device 10, or may be a peripheral unit provided outside of the electronic device 10 through a cable such as a universal serial bus (USB) cable.

The terminal device 20 includes a personal computer (PC), a network server, a tablet-type terminal, a smartphone, or an information processing device having functions similar to those units. Needless to say, the terminal device 20 has general functions such as those of a processor, a user interface, and a storage unit. The job registration table 18 may be stored in an item outside of the electronic device 10 that can communicate with the control unit 11, rather than in the storage unit 17, and may be stored, for example, in the storage unit 21 of the terminal device 20. Below, the expression "job registration table 18 held in the storage unit 17" may be read as "job registration table 18 held in the storage unit 21".

The configuration of the electronic device 10 may be considered to include FIG. 7 or FIG. 11 that will be described later. Embodiments in which such an electronic device 10 or system 30 executes will be described below. The following embodiments include description of a method of controlling the electronic device 30.

2. FIRST EMBODIMENT

Figure 2:
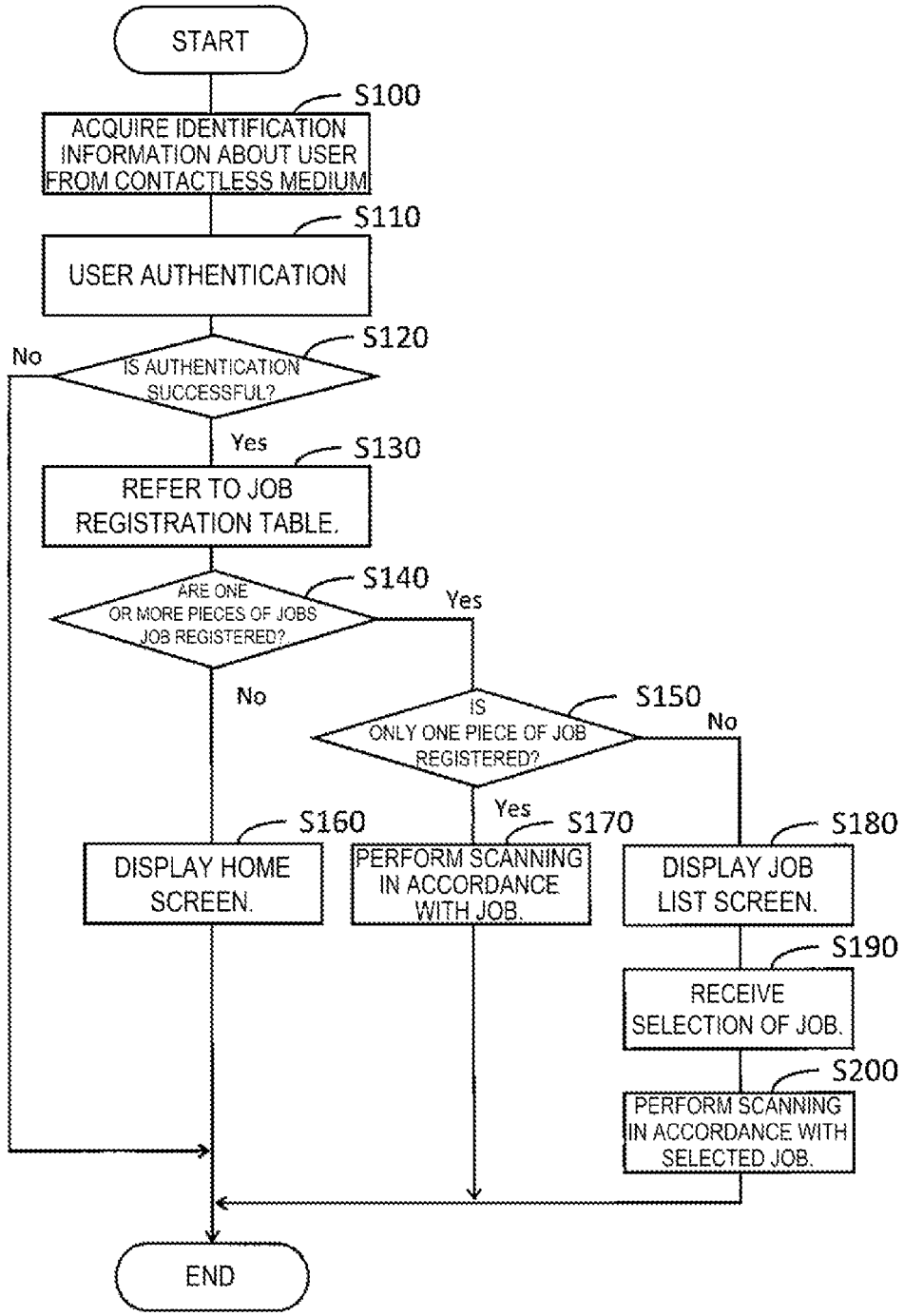
FIG. 2 is a flowchart showing a process executed by an electronic device according to a first embodiment.

FIG. 2 illustrates a flowchart of a process executed by the electronic device 10 in the first embodiment.

In step S100, the control unit 11 acquires identification information of a user from a contactless medium through the card reader 19. In other words, the user brings the contactless medium itself close to the card reader 19 to cause the card reader 19 to read the identification information. The card reader 19 that has read the identification information of the user from the contactless medium transfers this identification information to the control unit 11. This enables the control unit 11 to acquire the identification information of the user.

In step S110, the control unit 11 attempts user authentication. The user authentication will be described in brief. The control unit 11 determines whether or not the identification information acquired in step S100 matches any of identification information of each user registered in the storage unit 17 or the like in advance. When the identification information acquired in step S100 matches any of the identification information registered in the storage unit 17 or the like in advance, the control unit 11 determines the authentication as being successful in step S120, that is, as "Yes", and proceeds to step S130. On the other hand, when the identification information acquired in step S100 does not match any of the identification information registered in the storage unit 17 or the like in advance, the control unit 11 determines the authentication as being unsuccessful in step S120, that is, as "No", and ends the flowchart. Steps S110 and S120 correspond to an authentication step.

The following description will be made on the assumption that the user authentication is successful.

In step S130, the control unit 11 refers to the job registration table 18 held in the storage unit 17 to acquire a registration state of a job corresponding to the identification information acquired in step S100. Step S130 corresponds to a job acquiring step.

The process execution unit 16 executes a process in accordance with an instructed setting. The setting includes, for example, various types of settings concerning reading of an original document by the reading unit 16*a*, and various types of settings concerning printing to a printing medium by the printing unit 16*b*. The setting concerning reading includes, for example, a setting of color scanning or monochrome scanning, a setting of resolution in reading, a setting of a file format of the read image data, a setting of a folder in which a file is saved, or the like. The folder in which a file is saved may be set in the storage unit 17 or a memory within the electronic device 10, or may be set in a terminal device 20 or the like outside of the electronic device 10. The setting concerning printing includes, for example, a setting of color print or monochrome print, a setting of printing resolution, a setting of printing scaling, a setting of one-side printing or double-side printing, or the like. The "job" as used in the present embodiment means a combination of these settings. In other words, the job is a combination of user's favorite settings.

The following description will be made on the assumption that the process execution unit 16 is the reading unit 16*a*.

FIG. 3 illustrates, as an example, a portion of the job registration table 18. In the job registration table 18, identification information of a user and a job corresponding to the identification information are registered. Each piece of identification information registered in the job registration table 18 can be regarded as identification information that has been registered in advance and that is referred to at the time of user authentication in step S110. In the job registration table 18, for example, three corresponding jobs are registered in connection with identification information "123*". Furthermore, two corresponding jobs are registered in connection with identification information "456*". Furthermore, only one corresponding job is registered in connection with identification information "789*". Furthermore, no corresponding job is registered in connection with identification information "XYZ*".

The job 1 from among the three jobs corresponding to the identification information "123*" is, for example, a combination of a plurality of settings such as color scanning, PDF format, or folder 1. In addition, the job 2 is a combination of a plurality of settings such as monochrome scanning, PDF format, or folder 2. In addition, the job 3 is a combination of a plurality of settings such as color scanning, JPEG format, or folder 1**.

For example, each user or a person who is in charge of managing the system 30 operates the terminal device 20 to edit the job registration table 18, thereby being able to associate one or more favorite jobs with the user, namely, the identification information to register them in advance. Furthermore, for example, in place of the terminal device 20, it may be possible to operate the operating panel 13 to edit the job registration table 18.

The control unit 11 refers to the job registration table 18 in step S130, and makes determination of steps S140 and S150 on the basis of the acquired registration state of the job. In other words, when one or more jobs corresponding to the identification information acquired in step S100 are registered, determination of "Yes" is made in step S140, and the process proceeds to step S150. On the other hand, when no job corresponding to the identification information acquired in step S100 is registered, determination of "No" is made in step S140, and the process proceeds to step S160. Furthermore, when only one piece of job corresponding to the identification information acquired in step S100 is registered, determination of "Yes" is made in step S150, and the process proceeds to step S170. On the other hand, when two or more jobs corresponding to the identification information acquired in step S100 is registered, determination of "No" is made in step S150, and the process proceeds to step S180.

In step S160, the control unit 11 causes the display unit 14 to display a predetermined home screen concerning the electronic device 10 and ends the flowchart in FIG. 2. Various types of menus concerning the electronic device 10 that the user can select as appropriate are displayed on the home screen. Thus, after this, it is only necessary for the user to execute any operation to the home screen through the operating panel 13.

Here, in step S170, the control unit 11 controls the process execution unit 16, which is the reading unit 16*a* here, in accordance with the one piece of job registered so as to correspond to the identification information acquired in step S100, and executes scanning of the original document. For example, when the identification information acquired in step S100 is the identification information "789*", the control unit 11 causes the reading unit 16a to execute a process according to the job 6 registered so as to correspond to the identification information "789*" in the job registration table 18, and ends the flowchart in FIG. 2.

With the flow from step S100 to step S170, on the assumption that the original document is set at the reading unit 16a, the user brings a contactless medium close to the card reader 19 to cause the card reader 19 to read identification information of the contactless medium. This makes it possible to cause the electronic device 10 to execute scanning of the original document according to a favorite job registered in advance in association with the user, without executing any other operation. In association with step S170, the control unit 11 may cause the display unit 14 to display a screen indicating a job based on which the process execution unit 16 is currently executing a process. In the present embodiment, the wording "card touch" represents that a user brings a contactless medium close to the card reader 19 to cause the card reader 19 to read it. Note that the "card touch" does not necessarily mean that it is essential that the contactless medium such as a card is brought into contact with the card reader 19.

In step S180, the control unit 11 causes the display unit 14 to display a list of a plurality of pieces of jobs registered so as to correspond to the identification information acquired in step S100.

Figure 4:
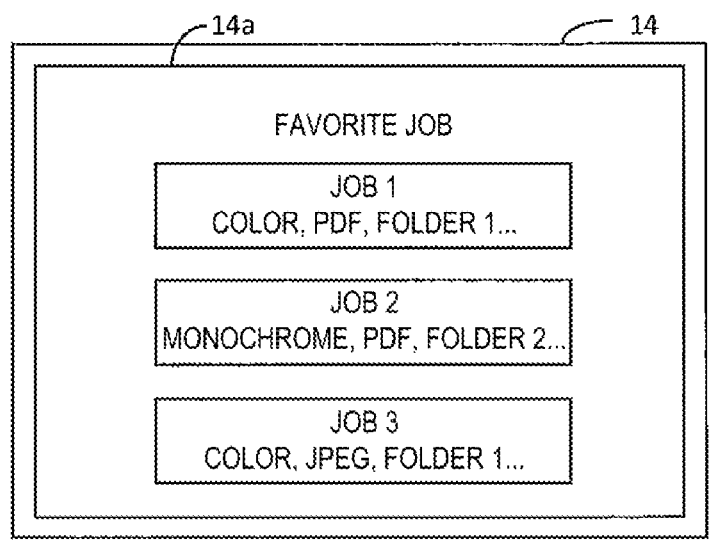
FIG. 4 is a diagram illustrating an example of a job list screen.

FIG. 4 illustrates an example of a job list screen 14a that the display unit 14 displays in step S180. For example, when the identification information acquired in step S100 is the identification information "123*", the control unit 11 causes the display unit 14 to display the jobs 1, 2, and 3 registered so as to correspond to the identification information "123*" in the job registration table 18, in a form of list as illustrated in FIG. 4.

In step S190, the control unit 11 receives selection of a job through an operation by a user from the list of jobs displayed in step S180. For example, the display unit 14 configured to display the job list screen 14a is a touch screen, and allow a user to touch any of the jobs 1, 2, and 3 displayed in a form of list to select any of the jobs 1, 2, and 3.

In step S200, the control unit 11 controls the process execution unit 16, which is the reading unit 16a here, in accordance with the selected job to execute scanning of the original document. For example, when the identification information acquired in step S100 is the identification information "123*" and the job 2 is selected from the jobs 1, 2, and 3 registered so as to correspond to the identification information "123*", the control unit 11 causes the reading unit 16a to execute a process according to the job 2, and ends the flowchart in FIG. 2. In association with step S200, the control unit 11 may cause the display unit 14 to display a screen indicating a job based on which the process execution unit 16 is currently executing a process, in a manner similar to step S170.

Such steps S140 to S200 correspond to a job display execution step.

With the flow from step S100 to step S200 in the first embodiment, on the assumption that the original document is set at the reading unit 16a, the user performs the card touch for the purpose of user authentication. Then, the user touches the job list screen 14a to select a job. Only by doing this, it is possible to cause the electronic device 10 to execute scanning of the original document according to any one of the favorite jobs registered in advance in association with the user.

In this manner, when determination of "No" is made in step S150, the control unit 11 causes the process execution unit 16 to execute a process according to the job selected through an operation by the user from among two or more jobs registered so as to correspond to the identification information acquired in step S100. This similarly applies to the second to sixth embodiments described later.

In the second to sixth embodiments, description of portions common to those in the embodiment described above will not be made, and processes after determination of "No" is made in step S150 will be described. In the second to sixth embodiments, the display unit 14 does not display the job list screen 14a, and a user performs an operation differing from the operation used for selection by touching any of a plurality of jobs within the job list screen 14a to select any job from among the plurality of jobs. In other words, the second to sixth embodiments are embodiments that respond to a demand for selecting a job using other methods that do not involve touching the touch screen in which a plurality of jobs are displayed in a form of list.

3. SECOND EMBODIMENT

Figure 5:
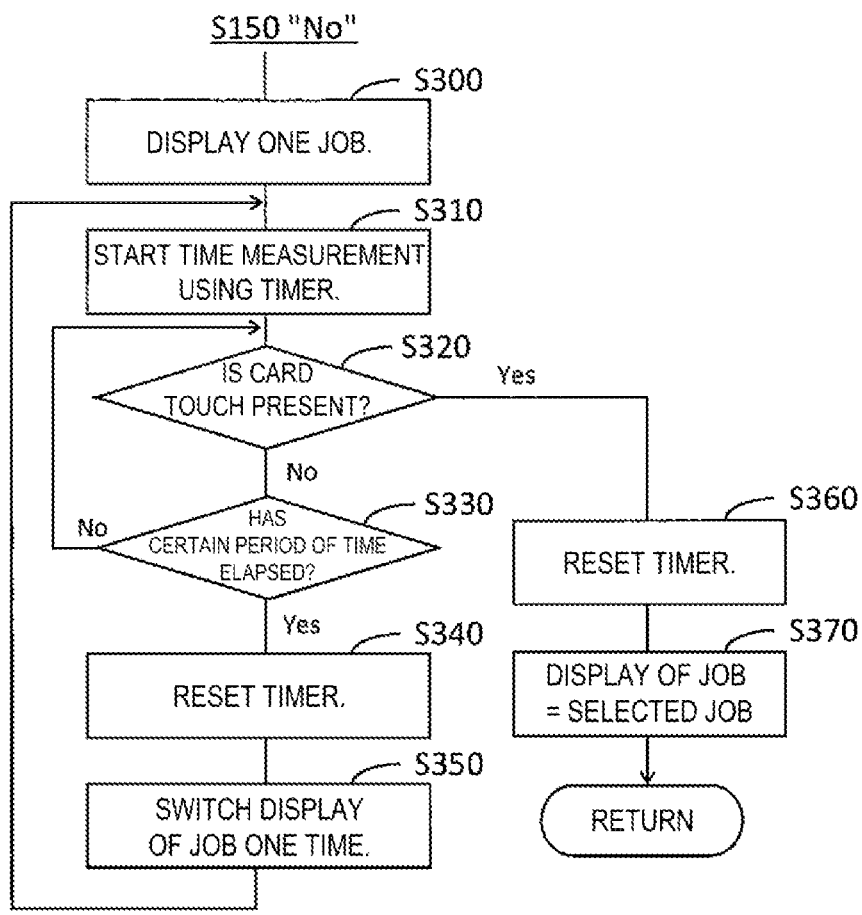
FIG. 5 is a flowchart showing a process according to a second embodiment after determination of "No" is made in step S150.

FIG. 5 illustrates a flowchart of a process according to the second embodiment after determination of "No" is made in step S150.

When determination of "No" is made in step S150, in step S300, the control unit 11 causes the display unit 14 to display one piece of job from among a plurality of pieces of jobs registered so as to correspond to the identification information acquired in step S100. When the identification information acquired in step S100 is the identification information "123*", in step S300, the control unit 11 causes the display unit 14 to display, for example, only the job 1 from among the jobs 1, 2, and 3 registered so as to correspond to the identification information "123*" in the job registration table 18.

In step S310, the control unit 11 starts time measurement using a timer.

In step S320, the control unit 11 determines whether or not the card touch is performed. In the second embodiment, in and after step S300, a user performs the card touch in a state where one piece of job is displayed by the display unit 14, to inform the control unit 11 of the intention of selecting the currently displayed job.

When the identification information that is the same as the identification information acquired in step S100 and used in the user authentication in step S110 is acquired again through the card reader 19 in and after step S300, the control unit 11 determines that the card touch exists, and proceeds from "Yes" in step S320 to step S360. As can be understood from the description above, steps S100 and S110 are performed with the trigger of the card touch. Thus, the card touch for which the presence or absence is determined in step S320 is the card touch after the user authentication.

When the card touch is not determined to be present in step S320, the control unit 11 determines in step S330 whether or not the period of time that the timer measures from step S310 reaches a predetermined certain period of time. During the time when it does not reach the certain period of time, the control unit 11 repeats the determination in step S320. When the card touch is not determined to be present in step S320 and the period of time that the timer measures from step S310 reaches the certain period of time, the control unit 11 proceeds from "Yes" in step S330 to step S340.

In step S340, the control unit 11 resets the period of time that the timer measures, that is, zeros the timer, and in step S350, the control unit 11 switches jobs that the display unit 14 displays. As described above, when the job 1 from among the jobs 1, 2, and 3 registered so as to correspond to the identification information "123***" is currently caused to be displayed by the display unit 14, the control unit 11 switches display of the job by the display unit 14 from the job 1 to the job 2. In other words, for every step S350, the control unit 11 switches the job displayed by the display unit 14 one time, for example, in the order of job 1→job 2→job 3→job 1 . . . . By way of step S350, the control unit 11 repeats step S310 and thereafter.

In step S360, the control unit 11 resets the timer. Step S360 is the same process as the process in step S340.

In step S370, the control unit 11 recognizes the job currently displayed by the display unit 14 as a job selected by the user, and proceeds to step S200 in FIG. 2. In other words, in the second embodiment, the flowchart in FIG. 5 is performed, instead of steps S180 and S190 in FIG. 2. In the second embodiment, for example, when the card touch is determined to be present in step S320 during a period of time when the display unit 14 displays the job 3 from among the jobs 1, 2, and 3 registered so as to correspond to the identification information "123***", the control unit 11 causes the reading unit 16a to execute a process according to the job 3 in step S200, and ends the flowchart in FIG. 2.

With the flow from step S100 to step S200 in the second embodiment, on the assumption that the original document is set at the reading unit 16a, the user executes user authentication through the card touch. Then, the user checks jobs displayed one by one by the display unit 14, and performs the card touch again. Only by doing this, it is possible to cause the electronic device 10 to execute scanning of the original document according to a favorite job that the display unit 14 is displaying.

4. THIRD EMBODIMENT

Figure 6:
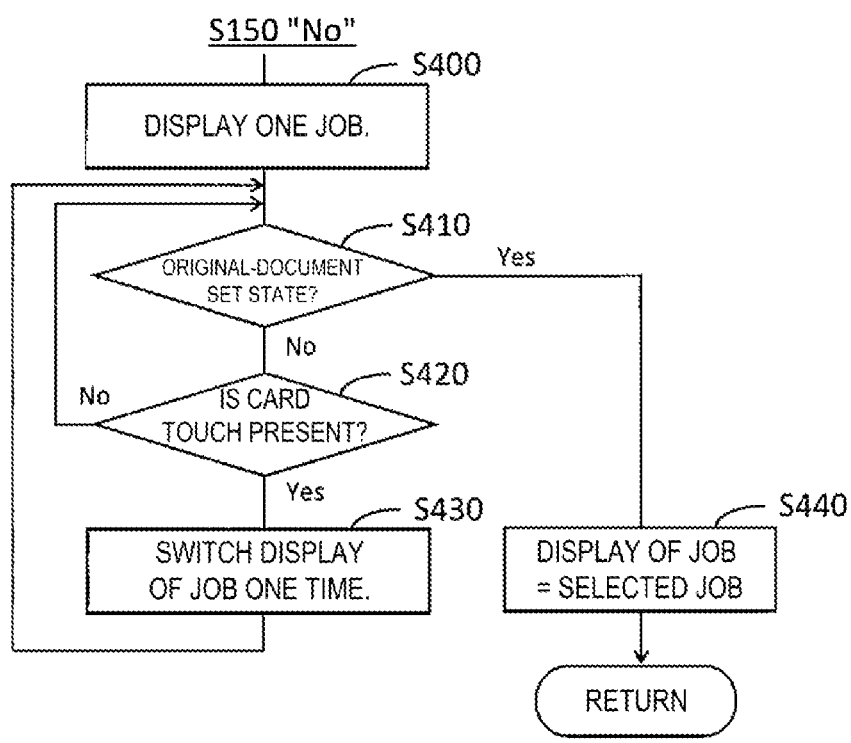
FIG. 6 is a flowchart showing a process according to a third embodiment after determination of "No" is made in step S150.

FIG. 6 illustrates a flowchart of a process according to a third embodiment after determination of "No" is made in step S150.

Figure 7:
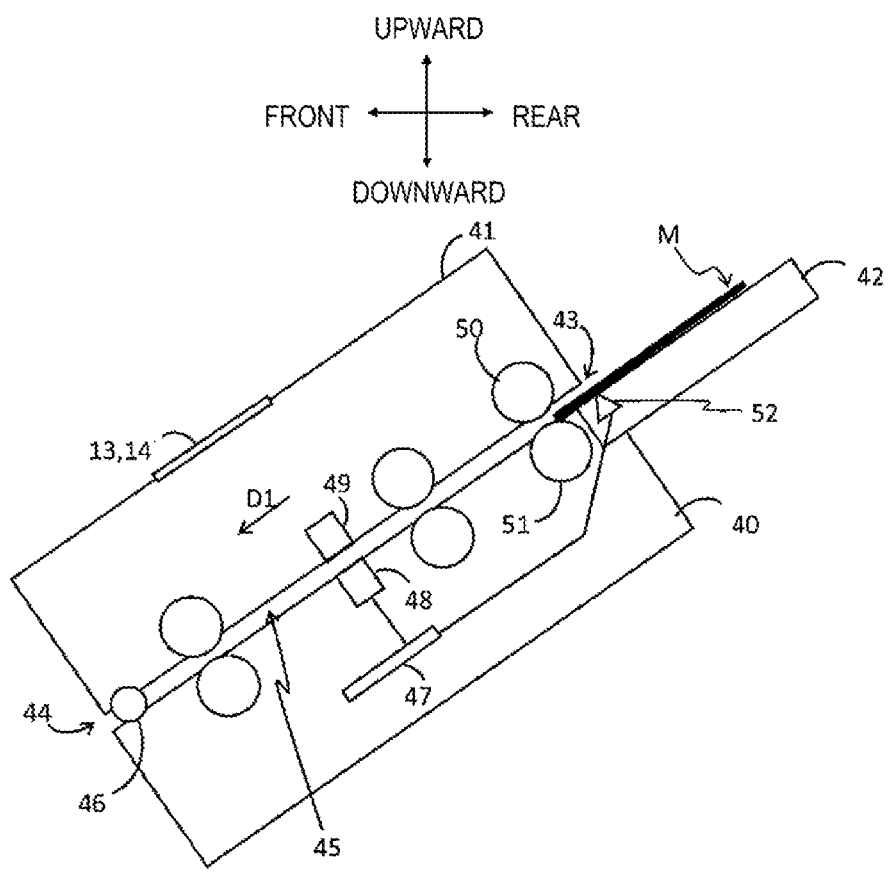
FIG. 7 is a diagram schematically illustrating a configuration or the like of the inside of an electronic device including a reading unit serving as a process execution unit, as viewed from a side.

FIG. 7 schematically illustrates the configuration or the like of the inside of the transport path 45 and the electronic device 10 including the reading unit 16a serving as the process execution unit 16, as viewed from a side. FIG. 7 will be described before description of FIG. 6.

FIG. 7 illustrates the upward, downward, front, and rear directions concerning the electronic device 10. The electronic device 10 includes a lower unit 40 and an upper unit 41 each serving as a housing. The lower unit 40 and the upper unit 41 are opposed to each other with the transport path 45 being interposed therebetween, the transport path 45 allowing the transported original document M to pass through. The lower unit 40 is mounted at the horizontal surface using a base, and the upper unit 41 covers the upper side of the lower unit 40. Thus, the upper unit 41 may be called a lid of the lower unit 40.

In the example in FIG. 7, the lower unit 40 and the upper unit 41 are connected through a hinge 46, and the upper unit 41 can rotate with the hinge 46 being the center. By rotating the upper unit 41, a user can bring the upper unit 41 into a closed state and an opened state. In FIG. 7, the upper unit 41 is in the closed state. The reference number 43 represents a supplying port 43 at the upstream side of the transport path 45, and the reference number 44 represents a discharge port 44 at the downstream side of the transport path 45. The reference character D1 represents a transport direction D1 directed from the upstream side of the transport path 45 toward the downstream side. An original document tray 42 used to mount the original document M is disposed at the rearward of the lower unit 40. The original document tray 42 is an example of a "medium mount portion" where a processing target medium is mounted before processing by the process execution unit 16. Note that the medium mount portion included in the printing unit 16b serving as the process execution unit 16 is called a paper feed tray or the like.

The original document M mounted at the original document tray 42 is pulled toward the inside of the transport path 45 from the supplying port 43, is transported downstream through the transport path 45, and is emitted to the outside from the discharge port 44. In the example in FIG. 7, the discharge port 44 is disposed at the frontward side of the supplying port 43. FIG. 7 illustrates some pairs of rolls disposed at the lower unit 40 and the upper unit 41 and opposed to each other with the transport path 45 being interposed therebetween, the pairs of rolls each serving as a transport unit included in the reading unit 16a. Each of the roller pairs is scattered along the transport path 45. Each of the roller pairs sandwiches the original document M between the roller and the roller that form a pair, and rotates with the power of a motor, which is not illustrated, to transport the original document M.

The roller pair comprised of rollers 50 and 51 disposed at the most upstream side of the roller pairs is disposed at a position slightly downstream of the supplying port 43. This roller pair causes the original document M mounted at the original document tray 42 to enter the transport path 45 one by one, and transports it to the downstream side. The other roller pairs will not be described. A first image sensor 48 serving as an imaging element is provided at the lower unit 40 and downstream of the roll pair comprised of the rollers 50 and 51 in the transport path 45, and a second image sensor 49 serving as an imaging element is provided at the upper unit 41. The first image sensor 48 reads a surface of the original document M that faces the lower unit 40 and is transported downstream along the transport path 45. The second image sensor 49 reads a surface of the original document M that faces the upper unit 41 and is transported downstream along the transport path 45.

The reference number 47 represents a printed wired board 47 at which the control unit 11 and a partial circuit or the like of the process execution unit 16 are mounted. The first image sensor 48 and the second image sensor 49, details of which will not be described, are coupled to the printed wired board 47. In addition, the operating panel 13 including the display unit 14 is disposed at a portion of the upper unit 41 that can be easily viewed from the outside.

The electronic device 10 includes a medium detecting sensor 52 configured to be able to detect the presence or absence of the original document M at the original document tray 42. In the example in FIG. 7, the medium detecting sensor 52 is provided at or around the supplying port 43 at the original document tray 42. The medium detecting sensor 52 is a sensor that can detect that a processing target medium is mounted at the medium mount portion. The type of detection of the medium detecting sensor 52 is not particularly limited, and it may be possible to employ an optical-type sensor, a mechanical-type sensor, or other various types of sensors. The signal indicating a result of detection by the medium detecting sensor 52 is transmitted to the control unit 11.

Description returns to FIG. 6. When determination of "No" is made in step S150, in step S400, the control unit 11 causes the display unit 14 to display one piece of job from among a plurality of pieces of jobs registered so as to correspond to the identification information acquired in step S100. Step S400 is a process that is the same as the process in step S300 in FIG. 5.

In step S410, the control unit 11 determines whether or not the device is in an "original-document set state" where the original document M has been set, in other words, whether or not the original document M is mounted at the original document tray 42. In a situation where the control unit 11 has acquired, from the medium detecting sensor 52, a detection signal indicating that an original document is present, the control unit 11 makes determination of "Yes" in step S410, and proceeds to step S440. On the other hand, in a situation where the control unit 11 acquires, from the medium detecting sensor 52, a detection signal indicating that no original document is present, the control unit 11 makes determination of "No" in step S410, and proceeds to step S420. In the third embodiment, in and after S400, a user sets the original document M at the original document tray 42 in a state where one piece of job is displayed by the displayed unit 14, thereby informing the control unit 11 of the intention of selecting the currently displayed job.

In step S420, the control unit 11 determines whether or not the card touch exists. In the third embodiment, in and after step S400, by performing the card touch in a state where one piece of job is displayed by the display unit 14, the user can switch display of jobs. The card touch for which the presence or absence is determined in step S420 is the card touch after the user authentication, as in step S320.

When the card touch is not determined to be present in step S420, the control unit 11 repeats determination in step S410. On the other hand, when the card touch is determined to be present in step S420, the control unit 11 proceeds from "Yes" in step S420 to step S430.

In step S430, the control unit 11 switches jobs displayed by the display unit 14. Step S430 is a process similar to that in step S350. After step S430, the control unit 11 repeats processes in and after step S410.

In step S440, the control unit 11 recognizes the job that the display unit 14 is currently displaying, as the job selected by the user, and proceeds to step S200 in FIG. 2. Step S440 is a process similar to that in step S370. In other words, in the third embodiment, the flowchart in FIG. 6 is performed, instead of steps S180 and S190 in FIG. 2. In the third embodiment, for example, when determination of the original-document set state is made in step S410 in a situation where the job 3 from among the jobs 1, 2, and 3 registered so as to correspond to the identification information "123*" is displayed by the display unit 14, the control unit 11 causes the reading unit 16***a* to execute a process according to the job 3 in step S200, and ends the flowchart in FIG. 2.

With the flow from step S100 to step S200 in the third embodiment, the user executes user authentication through the card touch. Then, the user can switch display of a single piece of job by the display unit 14 through the card touch, and check it. In addition, by setting the original document M at the original document tray 42, it is possible to cause the electronic device 10 to execute scanning of the original document M according to the favorite job that the display unit 14 is displaying.

5. FOURTH EMBODIMENT

Figure 8:
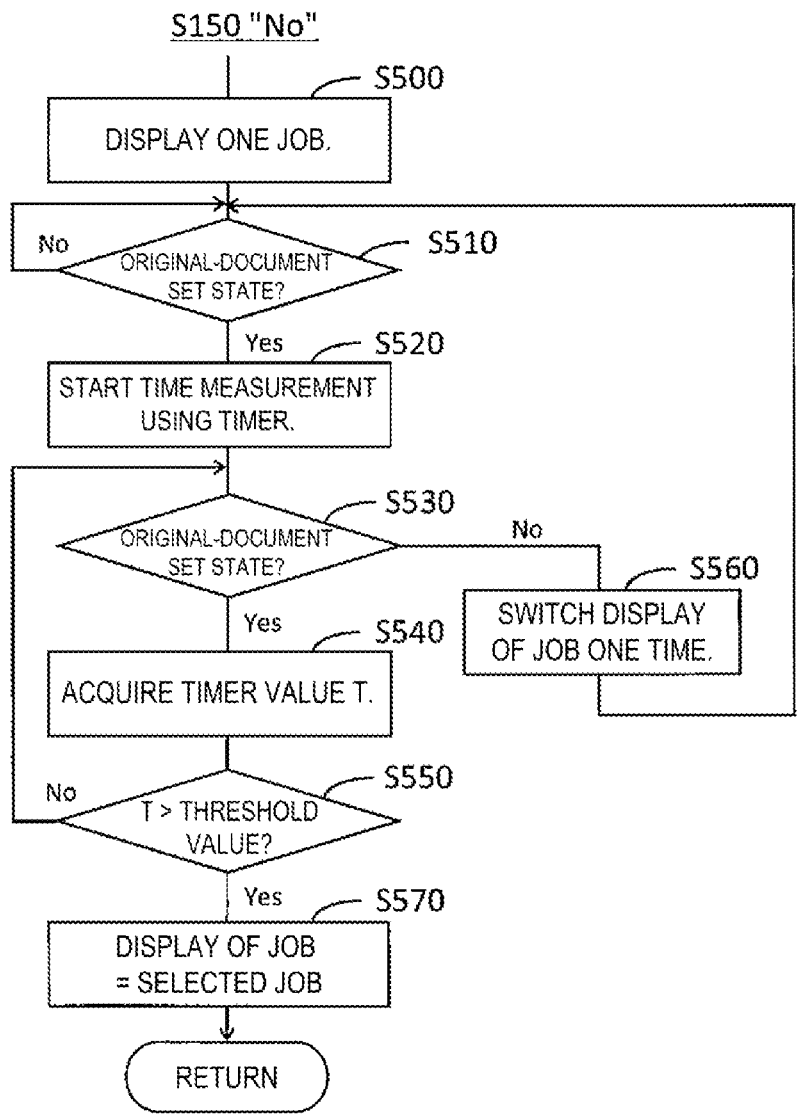
FIG. 8 is a flowchart showing a process according to a fourth embodiment after determination of "No" is made in step S150.

FIG. 8 illustrates a flowchart of a process according to the fourth embodiment after determination of "No" is made in step S150.

When determination of "No" is made in step S150, in step S500, the control unit 11 causes the display unit 14 to display one piece of job from among a plurality of pieces of jobs registered so as to correspond to the identification information acquired in step S100. Step S500 is a process that is the same as the process in step S300 in FIG. 5.

In step S510, the control unit 11 determines whether or not the device is in the original-document set state. Step S510 is the same process as the process in step S410 in FIG. 6. In a situation where the control unit 11 has acquired, from the medium detecting sensor 52, a detection signal indicating that an original document is present, the control unit 11 makes determination of "Yes" in step S510, and proceeds to step S520. On the other hand, in a situation where the control unit 11 has acquired, from the medium detecting sensor 52, a detection signal indicating that no original document is present, the control unit 11 makes determination of "No", and repeats determination in step S510. In the fourth embodiment, in and after step S500, by setting the original document M at the original document tray 42 in a state where one piece of job is displayed by the display unit 14, the user switches display of jobs or informs the control unit 11 of the intention of selecting the currently displayed job.

In step S520, the control unit 11 starts time measurement using a timer.

In step S530, the control unit 11 determines whether or not the device is in the original-document set state. In other words, after the time measurement using a time is started, the same determination as that in step S510 is made. The control unit 11 proceeds from determination of "Yes" in step S530 to step S540, or proceeds from determination of "No" to step S560. Note that the period of time from the start of the time measurement using a time in step S520 to the determination made in first step S530 is shorter than a threshold value used in determination in step S550 that will be described later.

In step S540, the control unit 11 acquires a current measured value (time value T) using a timer. The time value T is an elapsed time up to the present time from the start of the time measurement using a timer in step S520.

In step S550, the control unit 11 determines whether or not the timer value T acquired in step S540 exceeds a predetermined threshold value. The control unit 11 proceeds from determination of "Yes" to step S570 at the time of timer value T>threshold value, and proceeds from determination of "No" to step S530 at the time of timer value T threshold value. The threshold value is, for example, a period of time of approximately one second.

In step S560, the control unit 11 switches jobs displayed by the display unit 14. Step S560 is a process that is the same as the process in step S350. After step S560, the control unit 11 repeats processes in and after step S510. In other words, a user removes the original document M that has been mounted at the original document tray 42, from the original document tray 42 within a period of time equal to or less than the threshold value. With this action (hereinafter, referred to as "short-period original document set"), step S560 is performed.

On the other hand, in step S570, the control unit 11 recognizes the job currently displayed by the display unit 14, as the job selected by the user, and proceeds to step S200 in FIG. 2. Step S570 is the same process as that in step S370.

In other words, the user leaves the original document M mounted at the original document tray 42 even after the threshold value elapses (hereinafter, referred to as "long-period original document set"), whereby step S570 is performed. In this manner, the fourth embodiment performs the flowchart in FIG. 8, in place of steps S180 and S190 in FIG. 2.

With the flow from step S100 to step S200 in the fourth embodiment, the user executes user authentication through the card touch. Then, the user can switch display of a single piece of job by the display unit 14 through the short-period original document set, and check it. In addition, with the long-period original document set, it is possible to cause the electronic device 10 to execute scanning of the original document M in accordance with the favorite job that is being displayed by the display unit 14.

6. FIFTH EMBODIMENT

Figure 9:
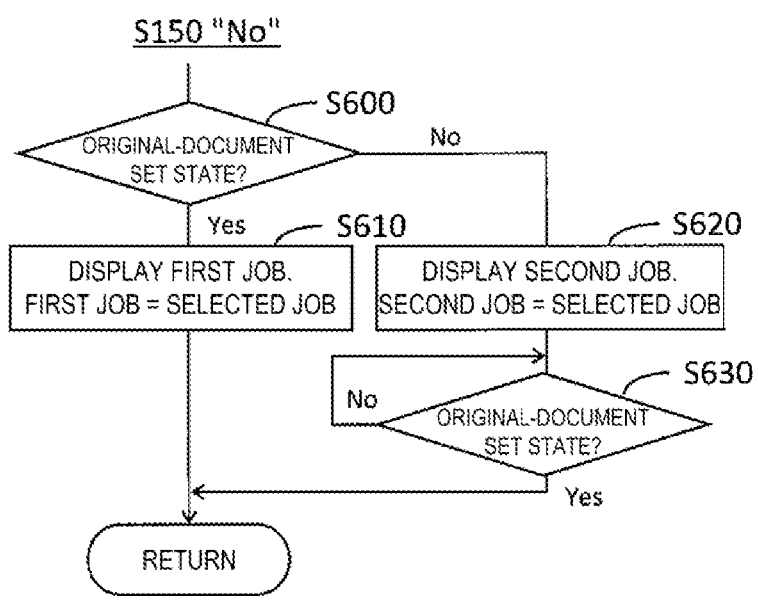
FIG. 9 is a flowchart showing a process according to a fifth embodiment after determination of "No" is made in step S150.

FIG. 9 illustrates a flowchart of a process according to the fifth embodiment after determination of "No" is made in step S150.

When determination of "No" is made in step S150, the control unit 11 determines in step S600 whether or not the device is in the original-document set state. Step S600 is the same process as the process in step S410 in FIG. 6. In a situation where the control unit 11 has acquired, from the medium detecting sensor 52, a detection signal indicating that the original document is present, the control unit 11 makes determination of "Yes" in step S600, and proceeds to step S610. On the other hand, in a situation where the control unit 11 has acquired, from the medium detecting sensor 52, a detection signal indicating that no original document is present, the control unit 11 makes determination of "No" in step S600, and proceeds to step S620.

In step S610, the control unit 11 causes the display unit 14 to display a first job that is one piece of job from among a plurality of pieces of jobs registered so as to correspond to the identification information acquired in step S100, and recognizes this first job as a job selected by the user. Then, the control unit 11 proceeds to step S200 in FIG. 2.

In step S620, the control unit 11 causes the display unit 14 to display a second job that is one piece of job from among a plurality of pieces of jobs registered so as to correspond to the identification information acquired in step S100, and recognizes this second job as a job selected by the user. The control unit 11 proceeds to step S200 in FIG. 2. The first job and the second job are jobs differing from each other. However, no original document M has been set at the point in time of step S620. Thus, in step S630, the control unit 11 makes determination that is the same as that in step S600. When determination of "original-document set state" is made, the control unit 11 proceeds to step S200. In this manner, the fifth embodiment performs the flowchart in FIG. 9, in place of steps S180 and S190 in FIG. 2.

In step S200 after step S610, the control unit 11 controls the reading unit 16a to cause it to execute scanning of the original document M according to the first job. On the other hand, in step S200 after step S620, the control unit 11 controls the reading unit 16a to cause it to execute scanning of the original document M according to the second job. In the fifth embodiment, in the job registration table 18, the first job and the second job are determined in advance from among a plurality of jobs registered so as to correspond to common identification information. For example, of the three pieces of jobs 1, 2, and 3 corresponding to the identification information "123*", it is assumed that the job 1 is the first job, and the job 2 is the second job. In addition, for example, as for two pieces of jobs 4 and 5 corresponding to the identification information "456*", it is assumed that the job 4 is the first job, and the job 5 is the second job. It can be said that the fifth embodiment is an embodiment particularly preferable when two pieces of jobs are registered for one piece of identification information.

With the fifth embodiment, by setting the original document M at the original document tray 42 before performing the card touch to execute user authentication, the use can cause the electronic device 10 to execute scanning of the original document M in accordance with the first job only through the card touch to execute user authentication. On the other hand, the card touch is performed to execute user authentication in a state where no original document M is disposed at the original document tray 42. Then, the original document M is set at the original document tray 42. Only by doing this, it is possible to cause the electronic device 10 to execute scanning of the original document M according to the second job.

7. SIXTH EMBODIMENT

Figure 10:
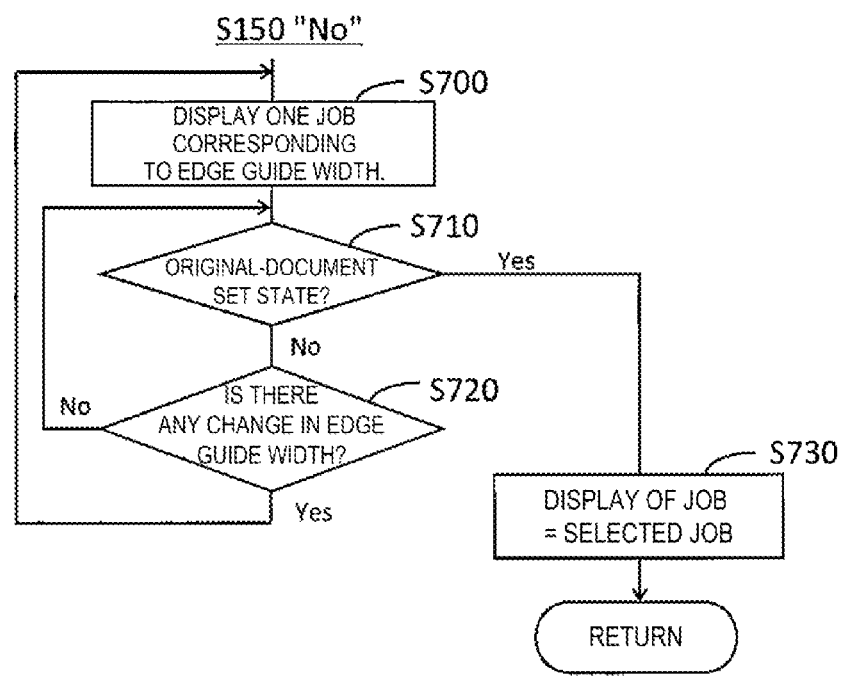
FIG. 10 is a flowchart showing a process according to a sixth embodiment after determination of "No" is made in step S150.

FIG. 10 illustrates a flowchart of a process according to the sixth embodiment after determination of "No" is made in step S150.

When determination of "No" is made in step S150, in step S700, the control unit 11 causes the display unit 14 to display one piece of job corresponding to the current edge guide width from among a plurality of pieces of jobs registered so as to correspond to the identification information acquired in step S100.

Figure 11:
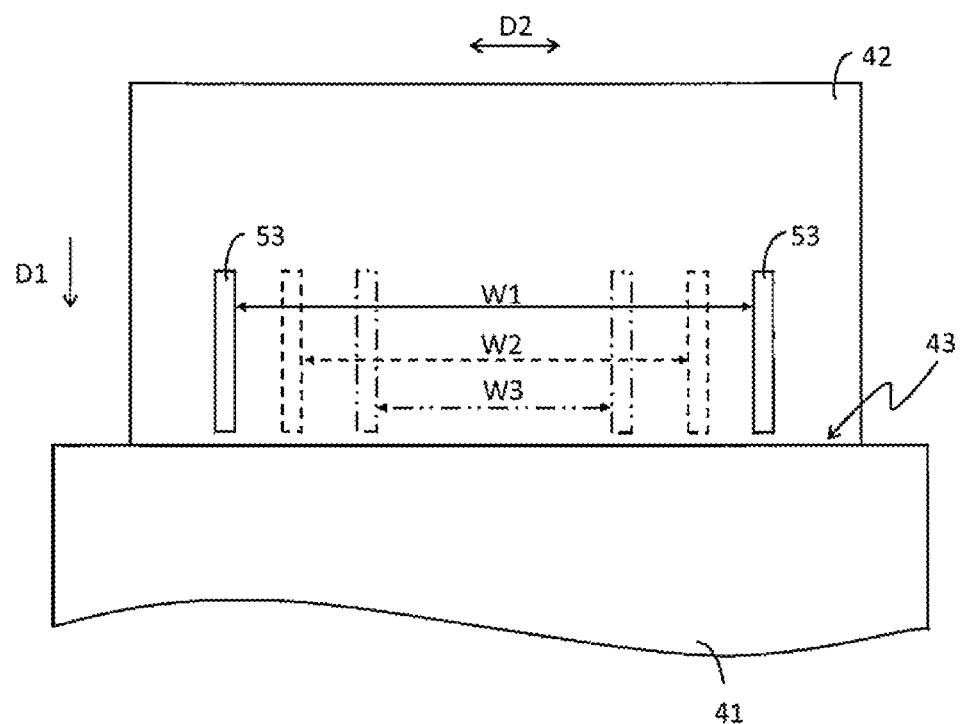
FIG. 11 is a diagram schematically illustrating an original document tray including an edge guide, as viewed from the front side.

FIG. 11 schematically illustrates the original document tray 42 or the like including a pair of edge guides 53, as viewed from the front side. Note that, in FIG. 7, the edge guides 53 are not illustrated. The edge guide 53 can slide in the width direction D2 of the original document M at the original document tray 42, and is a member used to regulate the position of the original document M in the width direction D2. The original document M is set at a position that is interposed between the pair of edge guides 53 in the width direction D2. The width direction D2 is perpendicular to the transport direction D1. In addition, each of the edge guides 53 that form a pair is a type of wall that vertically stands at the original document tray 42, and surfaces thereof that are parallel to the transport direction D1 are opposed to each other. Note that, in the present embodiment, the expression "parallel" or "perpendicular" is not limited to "parallel" or "perpendicular" in a strict sense, and includes a certain degree of error that occurs in actual products. The distance between the pair of edge guides 53 in the width direction D2 is referred to as an edge guide width.

The original document M includes, for example, a sheet with an A4 size, a letter, a receipt, or the like with various sizes. By causing the edge guides 53 to slide along the width direction D2, the user can change the edge guide width into a distance that fits the width of the original document M. FIG. 11 illustrates three types of the edge guide width as an example. The W1 represents an edge guide width by the pair of edge guides 53 illustrated with the solid line. Furthermore, the W2 represents an edge guide width when the pair of edge guides 53 are moved to the position indicated with the dashed line. The W3 represents an edge guide width when the pair of edge guides 53 are moved to the position indicated with the chain double-dashed line. W1>W2>W3 establishes. Of course, the edge guide width is not limited to the three types.

The control unit 11 recognizes the current edge guide width on the basis of a detection signal from a sensor, which is not illustrated, configured to detect a position of the edge guide 53 at the original document tray 42. In the sixth embodiment, it is assumed that, in the job registration table 18, a plurality of jobs registered so as to correspond to common identification information each correspond to any one of the edge guide widths. The job corresponding to an edge guide width means that the job is suitable for processing the original document M having a width corresponding to this edge guide width.

For the purpose of explaining the sixth embodiment, it is assumed that three pieces of jobs, which are the jobs 7, 8, and 9, are registered in the job registration table 18 so as to correspond to the identification information acquired in step S100. The job 7 corresponds to the edge guide width W1. The job 8 corresponds to the edge guide width W2. The job 9 corresponds to the edge guide width W3. Thus, in step S700, the control unit 11 causes the display unit 14 to display, for example, the job 7 when the current edge guide width is the W1.

In step S710, the control unit 11 determines whether or not the device is in the original-document set state. Step S710 is the same process as that in step S410 in FIG. 6. In a situation where the control unit 11 has acquired, from the medium detecting sensor 52, a detection signal indicating that an original document is present, the control unit 11 makes determination of "Yes" in step S710, and proceeds to step S730. On the other hand, in a situation where the control unit 11 has acquired, from the medium detecting sensor 52, a detection signal indicating that no original document is present, the control unit 11 makes determination of "No" in step S710, and proceeds to step S720. In the sixth embodiment, in and after step S700, a user sets the original document M at the original document tray 42 in a state where one piece of job is displayed by the display unit 14, thereby informing the control unit 11 of the intention of selecting the currently displayed job.

In step S720, the control unit 11 determines whether or not the edge guide width is changed. When the edge guide width differs from the edge guide width corresponding to the job that the display unit 14 is currently displaying, the control unit 11 determines that the edge guide width has been changed, and proceeds from "Yes" in step S720 to step S700. For example, when the job 7 is being displayed by the display unit 14 and the current edge guide width is the W2, this means the edge guide width is changed from the W1 to the W2. Thus, determination of "Yes" is made in step S720. When the control unit 11 does not determine in step S720 that the edge guide width is changed, the control unit 11 repeats determination in step S710.

In step S700 after step S720, the control unit 11 naturally switches jobs that the display unit 14 displays. In other words, display is switched from the job that the display unit 14 displays until then, to a job corresponding to the edge guide width at the point in time when determination of "Yes" is made in step S720. As in the example described above, if the edge guide width is changed from the W1 to the W2, in step S700 after step S720, the control unit 11 switches display of the job by the display unit 14 from the job 7 to the job 8.

In step S730, the control unit 11 recognizes the job currently displayed by the display unit 14 as the job selected by the user, and proceeds to step S200 in FIG. 2. Step S730 is the same process as that in step S370 in FIG. 5. In other words, the sixth embodiment performs the flowchart in FIG. 10, in place of steps S180 and S190 in FIG. 2. With the flow from step S100 to step S200 in the sixth embodiment, the user executes user authentication through the card touch. Then, the user changes the edge guide width, thereby being able to switch display of a single piece of job by the display unit 14, and check it. In addition, the original document M corresponding to the edge guide width is set at the original document tray 42. This makes it possible to cause the electronic device 10 to execute scanning of the original document M according to the favorite job that the display unit 14 is currently displaying.

8. CONCLUSION

As described above, with the present embodiment, an electronic device 10 that executes user authentication by acquiring identification information of a user from a contactless medium in which the identification information is written includes the process execution unit 16 configured to execute a process according a setting; the storage unit 17 in which a correspondence relationship between the identification information and a job that is a combination of the setting is registered in advance; the display unit 14; and the control unit 11. The control unit 11 refers to the storage unit 17 after user authentication is executed on the basis of the identification information acquired through a reader configured to read information from the contactless medium. When the job corresponding to the identification information acquired from the contactless medium is not registered in the storage unit 17, the control unit 11 causes the display unit 14 to display a predetermined home screen concerning the electronic device 10. When only one job corresponding to the identification information is registered in the storage unit 17, the control unit 11 causes the process execution unit 16 to execute a process according to the one job. When two or more jobs corresponding to the identification information are registered in the storage unit 17, the control unit 11 causes the process execution unit 16 to execute a process according to a job selected through an operation of the user from among the two or more jobs.

With this configuration, when only one piece of job corresponding to the identification information of the user is registered in the storage unit 17, the user can cause the electronic device 10 to execute a process according to the one piece of job only by performing the card touch for the purpose of user authentication. In addition, when two or more jobs corresponding to the identification information of the user is registered in the storage unit 17, the user performs card touch for the purpose of user authentication. Then, the user selects a job from among the two or more jobs, which makes it possible to cause the electronic device 10 to execute a process according to a desired job. That is, with the electronic device 10 that requires user authentication, it is possible to execute the user's favorite process through a simplified operation.

In addition, with the first embodiment, when two or more jobs corresponding to the identification information are registered in the storage unit 17, the control unit 11 causes the display unit 14 to display a list of the two or more jobs, and receives selection of a job from the list made through an operation by the user.

With this configuration, the user selects a job from among a plurality of jobs that the display unit 14 displays on the job list screen 14a, thereby being able to cause the electronic device 10 to execute a process according to a desired job.

Furthermore, with the second embodiment, when two or more jobs corresponding to the identification information are registered in the storage unit 17, the control unit 11 causes the display unit 14 to display the two or more jobs one by one switching therebetween at a predetermined interval, and recognizes a job displayed by the display unit 14 at the time when the reader reads a contactless medium, as a job selected by the user.

With this configuration, after performing the card touch for the purpose of user authentication, the user checks jobs switched at a predetermined interval and displayed one by one by the display unit 14, and selects a displayed job through the card touch again. This makes it possible to cause the electronic device 10 to execute a process according to a desired job.

The electronic device 10 includes: the medium mount portion where a processing target medium to be processed by the process execution unit 16 is mounted before processing by the process execution unit 16; and the medium detecting sensor 52 configured to be able to detect that the processing target medium is mounted at the medium mount portion.

In addition, with the third embodiment, when two or more jobs corresponding to the identification information are registered in the storage unit 17, the control unit 11 executes a process of causing the display unit 14 to display the two or more jobs one by one while switching displayed jobs every time the reader reads the contactless medium. In addition, the control unit 11 recognizes, as a job selected by the user, the job that the display unit 14 displays when the medium detecting sensor 52 detects that the processing target medium is mounted at the medium mount portion. With this configuration, the user performs the card touch for the purpose of user authentication. Then, the user checks jobs displayed one by one by the display unit 14 while changing the displayed jobs through the card touch, and selects the job that is being displayed with the processing target medium being mounted at the medium mount portion. This makes it possible to cause the electronic device 10 to execute a process according to the desired job.

In addition, with the fourth embodiment, when two or more jobs corresponding to the identification information are registered in the storage unit 17, the control unit 11 executes a process of causing the display unit 14 to display the two or more jobs one by one while switching the displayed jobs every time determination is made, on the basis of detection by the medium detecting sensor 52, such that the processing target medium is mounted at the medium mount portion for a period of time equal to or less than a predetermined threshold value, and then, is removed. Then, when it is determined, on the basis of detection by the medium detecting sensor 52, that the processing target medium is mounted at the medium mount portion for a period of time longer than the threshold value, the control unit 11 recognizes the job that the display unit 14 is displaying, as a job selected by the user.

With the configuration described above, after the user performs the card touch for the purpose of user authentication, the user checks jobs displayed one by one by the display unit 14 while switching the displayed jobs through the short-period original document set, and selects the job that is being displayed through the long-period original document set. This makes it possible to cause the electronic device 10 to execute a process according to a desired job.

With the fifth embodiment, when two or more jobs corresponding to the identification information are registered in the storage unit 17, the control unit 11 recognizes the first job from among the two or more jobs, as a job selected by the user in a state where the medium detecting sensor 52 detects that the processing target medium is mounted at the medium mount portion, and the control unit 11 recognizes the second job differing from the first job from among the two or more jobs, as a job selected by the user in a state where the medium detecting sensor 52 does not detect that the processing target medium is mounted at the medium mount portion.

With the configuration described above, the user selects the first job by mounting the processing target medium at the medium mount portion before the card touch is performed for the purpose of user authentication, and selects the second job by performing the card touch for the purpose of user authentication in a state where the processing target medium is not mounted at the medium mount portion. This makes it possible to cause the electronic device 10 to execute a process according to the selected job.

The electronic device 10 includes a pair of edge guides 53 configured to slide at the medium amount portion and in the width direction D2 of the processing target medium, and used to regulate the position of the processing target medium in the width direction D2.

In addition, with the sixth embodiment, when two or more jobs corresponding to the identification information are registered in the storage unit 17, the control unit 11 executes a process of causing the display unit 14 to display a job for processing the processing target medium having a width corresponding to a distance, in the width direction D2, between the pair of edge guides 53 from among the two or more jobs, this process being executed while the displayed jobs are being switched in response to a change in the distance between the pair of edge guides 53. In addition, the control unit 11 recognizes, as a job selected by the user, a job that the display unit 14 displays when the medium detecting sensor 52 detects that the medium to be process is mounted at the medium mount portion.

With the configuration described above, the user performs the card touch for the purpose of user authentication. Then, the user changes the edge guide width to switch the job displayed one by one by the display unit 14, and check it. By mounting the processing target medium at the medium mount portion and selecting the job that is being displayed, it is possible to cause the electronic device 10 to execute a process according to the desired job.

The present embodiments not only disclose the electronic device 10 but also discloses a disclosure of each category including the system 30, a method, and a program 12. The method of controlling the electronic device 10 includes: the authentication step of executing user authentication on the basis of identification information of a user acquired through a reader configured to read information from a contactless medium in which the identification information is written; the job acquiring step of referring to a storage unit in which a correspondence relationship between the identification information and a job that is a combination of a setting concerning a process executed by the electronic device 10 is registered in advance, to acquire a registration state of the job corresponding to the identification information acquired from the contactless medium; and the job display execution step of: causing the display unit 14 to display a predetermined home screen concerning the electronic device 10 when the job corresponding to the identification information is not registered in the storage unit; causing the electronic device 10 to execute a process according to one job when only the one job corresponding to the identification information is registered in the storage unit; and causing the electronic device 10 to execute a process according to a job selected through an operation of the user from among two or more jobs when the two or more jobs corresponding to the identification information are registered in the storage unit.

The control system 30 for the electronic device 10 includes the electronic device 10 configured to execute user authentication by acquiring identification information of a user from a contactless medium in which the identification information is written, and the terminal device 20 coupled to the electronic device 10 in a communicable manner, in which the electronic device 10 includes the process execution unit 16 configured to execute a process according to a setting, the display unit 14, and the control unit 11, and the terminal device 20 includes the storage unit 21 in which a correspondence relationship between the identification information and a job that is a combination of the setting is registered in advance. In addition, the control unit 11 communicates with the terminal device 20 to refer to the storage unit 21 after user authentication is executed on the basis of the identification information acquired through a reader configured to read information from the contactless medium. When the job corresponding to the identification information is not registered in the storage unit 21, the control unit 11 causes the display unit 14 to display a predetermined home screen concerning the electronic device 10. When only one job corresponding to the identification information is registered in the storage unit 21, the control unit 11 causes the process execution unit 16 to execute a process according to the one job. When two or more jobs corresponding to the identification information are registered in the storage unit 21, the control unit 11 causes the process execution unit 16 to execute a process according to a job selected through an operation of the user from among the two or more jobs.

As for other embodiments, when determination of "Yes" is made in step S150 in FIG. 2, the control unit 11 may proceed to step S170 on condition that an "immediate execution setting" is enabled, rather than proceeding to step S170 without any condition. The immediate execution setting represents a setting in which, in a situation where a job to be executed has already been decided, a process according to this job is executed after user authentication and without confirmation from the user. A user can set the immediate execution setting to be enabled or disabled in advance. When determination of "Yes" is made in step S150 and the immediate execution setting is disabled, the control unit 11 receives, from the user, permission again to execute a process according to only the one piece of job, and proceeds to step S170. In addition, a configuration in which permission for performance is received from a user when such an immediate execution setting is disabled may be employed in step S190 according to the first embodiment or at the time of receiving selection of a job according to the second to sixth embodiments or at timing prior to step S200 being performed.

What is claimed is:

1. An electronic device that executes user authentication by acquiring identification information of a user from a contactless medium in which the identification information is written, comprising:
a process execution unit configured to execute a process according to a setting;
a storage unit in which a correspondence relationship between the identification information and a job that is a combination of the setting is registered in advance;
a display unit configured to display predetermined information; and
a control unit configured to control the electronic device, wherein
the control unit refers to the storage unit after user authentication is executed on a basis of the identification information acquired through a reader configured to read information from the contactless medium,
when the job corresponding to the identification information is not registered in the storage unit, the control unit causes the display unit to display a predetermined home screen concerning the electronic device,
when only one job corresponding to the identification information is registered in the storage unit, the control unit causes the process execution unit to execute a process according to the one job, and
when two or more jobs corresponding to the identification information are registered in the storage unit, the control unit causes the process execution unit to execute a process according to a job selected through an operation of the user from among the two or more jobs,
wherein when two or more jobs corresponding to the identification information are registered in the storage unit, the control unit causes the display unit to display the two or more jobs one by one switching therebetween at a predetermined interval, and recognizes, as a job selected by the user, a job displayed by the display unit when the reader reads the contactless medium.

2. An electronic device that executes user authentication by acquiring identification information of a user from a contactless medium in which the identification information is written, comprising:
a process execution unit configured to execute a process according to a setting;
a storage unit in which a correspondence relationship between the identification information and a job that is a combination of the setting is registered in advance;
a display unit configured to display predetermined information; and
a control unit configured to control the electronic device, wherein
the control unit refers to the storage unit after user authentication is executed on a basis of the identification information acquired through a reader configured to read information from the contactless medium,
when the job corresponding to the identification information is not registered in the storage unit, the control unit causes the display unit to display a predetermined home screen concerning the electronic device,
when only one job corresponding to the identification information is registered in the storage unit, the control unit causes the process execution unit to execute a process according to the one job, and
when two or more jobs corresponding to the identification information are registered in the storage unit, the control unit causes the process execution unit to execute a process according to a job selected through an operation of the user from among the two or more jobs,
the electronic device further comprising:
a medium mount portion where a processing target medium to be processed by the process execution unit is mounted before processing by the process execution unit; and
a medium detecting sensor configured to detect that the processing target medium is mounted at the medium mount portion, wherein
when two or more jobs corresponding to the identification information are registered in the storage unit, the control unit executes a process of causing the display unit to display the two or more jobs one by one switching therebetween every time the reader reads the contactless medium, and the control unit recognizes, as a job selected by the user, a job that the display unit displays when the medium detecting sensor detects that the processing target medium is mounted at the medium mount portion.

3. An electronic device that executes user authentication by acquiring identification information of a user from a contactless medium in which the identification information is written, comprising:
- a process execution unit configured to execute a process according to a setting;
- a storage unit in which a correspondence relationship between the identification information and a job that is a combination of the setting is registered in advance;
- a display unit configured to display predetermined information; and
- a control unit configured to control the electronic device, wherein
- the control unit refers to the storage unit after user authentication is executed on a basis of the identification information acquired through a reader configured to read information from the contactless medium,
- when the job corresponding to the identification information is not registered in the storage unit, the control unit causes the display unit to display a predetermined home screen concerning the electronic device,
- when only one job corresponding to the identification information is registered in the storage unit, the control unit causes the process execution unit to execute a process according to the one job, and
- when two or more jobs corresponding to the identification information are registered in the storage unit, the control unit causes the process execution unit to execute a process according to a job selected through an operation of the user from among the two or more jobs,
- the electronic device further comprising:
- a medium mount portion where a processing target medium to be processed by the process execution unit is mounted before processing by the process execution unit; and
- a medium detecting sensor configured to detect that the processing target medium is mounted at the medium mount portion, wherein
- when two or more jobs corresponding to the identification information are registered in the storage unit, the control unit executes a process of causing the display unit to display the two or more jobs one by one switching therebetween every time determination is made, on a basis of detection by the medium detecting sensor, that the processing target medium is mounted at the medium mount portion for a period of time equal to or less than a predetermined threshold value, and then, is removed, and
- when it is determined, on a basis of detection by the medium detecting sensor, that the processing target medium is mounted at the medium mount portion for a period of time longer than the threshold value, the control unit recognizes, as a job selected by the user, a job that the display unit is displaying.

4. An electronic device that executes user authentication by acquiring identification information of a user from a contactless medium in which the identification information is written, comprising:
- a process execution unit configured to execute a process according to a setting;
- a storage unit in which a correspondence relationship between the identification information and a job that is a combination of the setting is registered in advance;
- a display unit configured to display predetermined information; and
- a control unit configured to control the electronic device, wherein
- the control unit refers to the storage unit after user authentication is executed on a basis of the identification information acquired through a reader configured to read information from the contactless medium,
- when the job corresponding to the identification information is not registered in the storage unit, the control unit causes the display unit to display a predetermined home screen concerning the electronic device,
- when only one job corresponding to the identification information is registered in the storage unit, the control unit causes the process execution unit to execute a process according to the one job, and
- when two or more jobs corresponding to the identification information are registered in the storage unit, the control unit causes the process execution unit to execute a process according to a job selected through an operation of the user from among the two or more jobs,
- the electronic device further comprising:
- a medium mount portion where a processing target medium to be processed by the process execution unit is mounted before processing by the process execution unit; and
- a medium detecting sensor configured to detect that the processing target medium is mounted at the medium mount portion, wherein
- when two or more jobs corresponding to the identification information are registered in the storage unit, the control unit recognizes a first job from among the two or more jobs as a job selected by the user in a state where the medium detecting sensor detects that the processing target medium is mounted at the medium mount portion, and the control unit recognizes a second job differing from the first job from among the two or more jobs as a job selected by the user in a state where the medium detecting sensor does not detect that the processing target medium is mounted at the medium mount portion.

5. An electronic device that executes user authentication by acquiring identification information of a user from a contactless medium in which the identification information is written, comprising:
- a process execution unit configured to execute a process according to a setting;
- a storage unit in which a correspondence relationship between the identification information and a job that is a combination of the setting is registered in advance;
- a display unit configured to display predetermined information; and
- a control unit configured to control the electronic device, wherein
- the control unit refers to the storage unit after user authentication is executed on a basis of the identification information acquired through a reader configured to read information from the contactless medium,
- when the job corresponding to the identification information is not registered in the storage unit, the control unit causes the display unit to display a predetermined home screen concerning the electronic device,
- when only one job corresponding to the identification information is registered in the storage unit, the control unit causes the process execution unit to execute a process according to the one job, and when two or more jobs corresponding to the identification information are registered in the storage unit, the control unit causes the process execution unit to execute a process according to a job selected through an operation of the user from among the two or more jobs, the electronic device further comprising:

a medium mount portion where a processing target medium to be processed by the process execution unit is mounted before processing by the process execution unit;

a medium detecting sensor configured to detect that the processing target medium is mounted at the medium mount portion; and a pair of edge guides configured to slide at the medium amount portion in a width direction of the processing target medium, and used to regulate a position of the processing target medium in the width direction, wherein when two or more jobs corresponding to the identification information are registered in the storage unit, the control unit executes a process of causing the display unit to display a job for processing the processing target medium having a width corresponding to a distance, in the width direction, between the pair of edge guides from among the two or more jobs, the control unit executing the process while switching the displayed job in response to a change in the distance between the pair of edge guides, and the control unit recognizes, as a job selected by the user, a job that the display unit displays when the medium detecting sensor detects that the processing target medium is mounted at the medium mount portion.

* * * * *